United States Patent
Sáenz Domínguez et al.

(10) Patent No.: US 12,441,970 B2
(45) Date of Patent: Oct. 14, 2025

(54) PRO-BIOFILM COATING, METHOD FOR THE PRODUCTION THEREOF AND SUBSTRATE COATED WITH THE SAME

(71) Applicants: UNIVERSIDAD DE LA RIOJA, Logroño (ES); FUNDACIÓN RIOJA SALUD, Logroño (ES)

(72) Inventors: Yolanda Sáenz Domínguez, Logroño (ES); Fernando Alba Elías, Logroño (ES); María López Martínez, Logroño (ES); Elisa Sainz García, Logroño (ES); Carmen Lozano Fernández, Logroño (ES); Rodolfo Múgica Vidal, Logroño (ES); Beatriz Rojo Bezares, Logroño (ES); Ana González Marcos, Logroño (ES); Paula Toledano Regalado, Logroño (ES); Ignacio Muro Fraguas, Logroño (ES)

(73) Assignees: UNIVERSIDAD DE LA RIOJA, Logroño (ES); FUNDACIÓN RIOJA SALUD, Logroño (ES)

( * ) Notice: Subject to any disclaimer, the term of this patent is extended or adjusted under 35 U.S.C. 154(b) by 1019 days.

(21) Appl. No.: 17/441,737

(22) PCT Filed: Mar. 20, 2020

(86) PCT No.: PCT/ES2020/070195
§ 371 (c)(1),
(2) Date: Sep. 22, 2021

(87) PCT Pub. No.: WO2020/193830
PCT Pub. Date: Oct. 1, 2020

(65) Prior Publication Data
US 2022/0204904 A1    Jun. 30, 2022

(30) Foreign Application Priority Data
Mar. 25, 2019 (ES) .............................. ES201930265

(51) Int. Cl.
*C12M 1/00* (2006.01)
*B05D 1/00* (2006.01)
(Continued)

(52) U.S. Cl.
CPC .............. *C12M 23/20* (2013.01); *B05D 1/62* (2013.01); *C12M 23/10* (2013.01); *C12M 25/00* (2013.01);
(Continued)

(58) Field of Classification Search
None
See application file for complete search history.

(56) References Cited

FOREIGN PATENT DOCUMENTS

| JP | 2013173715 A | 9/2013 | |
| WO | WO-2016131984 A1 * | 8/2016 | ............... B05D 1/62 |

OTHER PUBLICATIONS

Múgica-Vidal, Rodolfo et al., Reducing friction on glass substrates by atmospheric plasma-polymerization of APTES, Surface & Coatings Technology, vol. 309 (2017) pp. 1062-1071.
(Continued)

*Primary Examiner* — William H. Beisner
(74) *Attorney, Agent, or Firm* — LUCAS & MERCANTI, LLP

(57) ABSTRACT

The invention relates to a pro-biofilm coating applied by means of cold atmospheric plasma polymerization of a precursor on a substrate. The coating has a roughness such that it promotes the creation of more than 100% biofilm on the substrate, where the 100% of biofilm is the one as produced on the same substrate being devoid of said pro-biofilm coating. The invention also relates to a method of producing said pro-biofilm coating and a substrate coated with same.

15 Claims, 9 Drawing Sheets

(51) Int. Cl.
- C12M 1/12 (2006.01)
- C12M 1/22 (2006.01)
- C23C 16/02 (2006.01)
- C23C 16/40 (2006.01)
- C23C 16/455 (2006.01)
- C23C 16/513 (2006.01)

(52) U.S. Cl.
CPC ........ *C23C 16/0227* (2013.01); *C23C 16/401* (2013.01); *C23C 16/4551* (2013.01); *C23C 16/513* (2013.01)

(56) References Cited

OTHER PUBLICATIONS

Múgica-Vidal, Rodolfo et al., Hydrophobicity attainment and wear resistance enhancement on glass substrates by atmospheric plasma-polymerization of mixtures of an aminosilane and a fluorocarbon, Applied Surface Science, vol. 347 (2015) pp. 325-335.

Múgica-Vidal, Rodolfo et al., Atmospheric plasma-polymerization of hydrophobic and wear-resistant coatings on glass substrates, Surface & Coatings Technology, vol. 259 (2014) pp. 374-385.

Mokter Hossain, MD et al., Improvement of mechanical strength of hydrophobic coating on glass surfaces by an atmospheric pressure plasma jet, Surface & Coatings Technology, vol. 357 (2019) pp. 12-22.

Ramkumar, M C et al., Atmospheric pressure non-thermal plasma assisted polymerization of poly (ethylene glycol) methylether methacrylate (PEGMA) on low density polyethylene (LDPE) films for enhancement of biocompatibility, Surface & Coatings Technology, vol. 329 (2017) pp. 55-67.

Venault, A. et al., Biofouling-resistance control of expanded poly(tetrafluoroethylene) membrane via atmospheric plasma-induced surface PEGylation, Journal of Membrane Science, vol. 439 (2013) pp. 48-57.

Yin, Shiheng et al., Argon plasma-induced graft polymerization of PEGMA on chitosan membrane surface for cell adhesion improvement, Plasma Science and Technology, vol. 15, No. 10 (2013) pp. 1041-1046.

\* cited by examiner

PRO-BIOFILM COATING, METHOD FOR THE PRODUCTION THEREOF AND SUBSTRATE COATED WITH THE SAME

CROSS REFERENCE TO RELATED APPLICATIONS

This application is a national phase entry under 35 U.S.C. § 371 of International Application PCT/ES2020/070195, filed Mar. 20, 2020, which claims the benefit of Spain Application No. 201930265 filed Mar. 25, 2019, all of which are herein incorporated by reference in their entirety.

FIELD OF THE INVENTION

The present invention relates to the field of bacterial control, more specifically the control of bacterial biofilms, and in particular to the promotion of the occurrence of bacterial biofilms.

BACKGROUND OF THE INVENTION

A biofilm is a cluster of microorganisms surrounded by a matrix of extracellular polymeric substances including water, polysaccharides, proteins, lipids, nucleic acids, and other biopolymers. This extracellular matrix favors the adhesion of microorganisms to surfaces, protects them from adverse environmental conditions and from antimicrobial agents, and helps them to take in nutrients from the medium to facilitate microbial proliferation.

The development of a biofilm takes place in the following steps: a step of initial fixing in which the bacterial cells adhere to and colonize solid surfaces. This is followed by the steps of proliferation and maturation in which, by means of activating intercellular communication systems, the formation of microcolonies and the extracellular matrix begins, achieving optimal population density and a mature biofilm structure. Finally the step of dispersion takes place, in which bacterial cells or components of the biofilm can separate from the same, migrate, and colonize other surfaces, which represents a persistent source of spread and contamination.

In most cases, the occurrence of a biofilm entails a series of problems and hazardous consequences; therefore, techniques focusing primarily on the prevention and elimination of the biofilm are used and developed, such as anti-biofilm coatings or methods.

Biofilms deteriorate products or surfaces on which they develop but, in addition, when they are formed by pathogenic microorganisms, they are grounds for great concern in the food, pharmaceutical, or clinical industry since they represent a source of product contamination and a public health risk. For example, in the case of food process and processing equipment, as well as on the contact surfaces of the same, the elimination of a pathogenic biofilm plays a vital role in ensuring an optimal state of dietary microbiological quality. The biofilm acts as a reservoir which can protect or release free-living (planktonic) pathogenic bacteria, particularly hard-to-control ubiquitous organisms, which results in bacterial persistence at the production site and cross-contamination episodes of foods, with evident food safety risks.

However, there are certain situations in which the generation of more biofilm represents an advantage. An example is the case of the medical industry, for diagnosis and treatment election purposes. When a pathogenic (disease-causing) microorganism is studied in the laboratory (in vitro), it is desirable for this microorganism to behave similarly to how it would in a patient (in vivo). Conventionally, microbiology laboratories have focused their activities on isolating and performing sensitivity studies on bacteria in the planktonic form. However, extrapolating antimicrobial (including biocide) sensitivity data to that same bacterium when it is growing in a biofilm leads to therapeutic failures, industrial technical problems, the recurrence of chronic infections, an increase in the likelihood of food product or industrial surface contamination, among many other problems.

To perform in vitro studies of microorganisms, it would be desirable to have a simple, manageable model that is capable of providing a suitable in vivo therapy. Problems with choosing the wrong antibiotic agent or inadequate doses would thereby be prevented. Furthermore, it would be desirable to have a pro-biofilm coating that allows biofilm to be produced in said model rapidly so as to thus accelerate the aforementioned in vitro studies.

Other cases in which it may be desirable to promote the occurrence of a specific biofilm are in the food industry and in environmental bioremediation or biodegradation processes. In these cases, it would be desirable to have a pro-biofilm coating which, when applied, for example, to a fermentation tank and inoculated with a beneficial microorganism, allows the production of a biofilm thereof to be promoted. Said beneficial microorganism will in turn allow the fermentation tank to be protected against colonization by other harmful microorganisms.

JP2013173715A discloses a method of forming a biofilm by means of plasma irradiation treatment on a surface such as a polycarbonate plate. The plasma treatment causes a chemical modification of the polycarbonate which favors the adhesion of microorganisms which may eventually form a first biofilm. This first biofilm in turn favors the adhesion of new microorganisms which will form a new biofilm. However, the chemical modification of the surface by means of plasma treatment depends on the material constituting said surface, and therefore not all surfaces may be favorably modified by means of said method. Furthermore, the adhesive capacity of species generated on the polycarbonate surface by means of plasma treatment gradually decreases over time.

Therefore, it would be desirable to have a pro-biofilm coating which favors the production of biofilm regardless the surface on which said coating is applied and conserves its pro-biofilm properties over time.

SUMMARY OF THE INVENTION

To solve the problems indicated above, the present invention discloses, in a first aspect thereof, a pro-biofilm coating applied by means of cold atmospheric plasma polymerization of a precursor on a substrate. The coating according to the present invention has a roughness such that it promotes the creation of more than 100% biofilm on the substrate, where the 100% of biofilm is the one as produced on the same substrate being devoid of said pro-biofilm coating.

In a second aspect, the present invention discloses a method of producing a pro-biofilm coating as defined in the first aspect of the invention. The method comprises applying a cold atmospheric plasma stream and precursor material on a substrate surface to be coated until obtaining a roughness such that it promotes the creation of more than 100% biofilm on the substrate.

The invention also relates to a substrate which is coated with a pro-biofilm coating according to the first aspect of the invention.

BRIEF DESCRIPTION OF THE DRAWINGS

The present invention will be better understood in reference to the following drawings which illustrate preferred embodiments of the present invention, provided by way of example, and should not be interpreted as being limiting of the invention in any way.

DETAILED DESCRIPTION OF THE PREFERRED EMBODIMENTS

Figure 1:
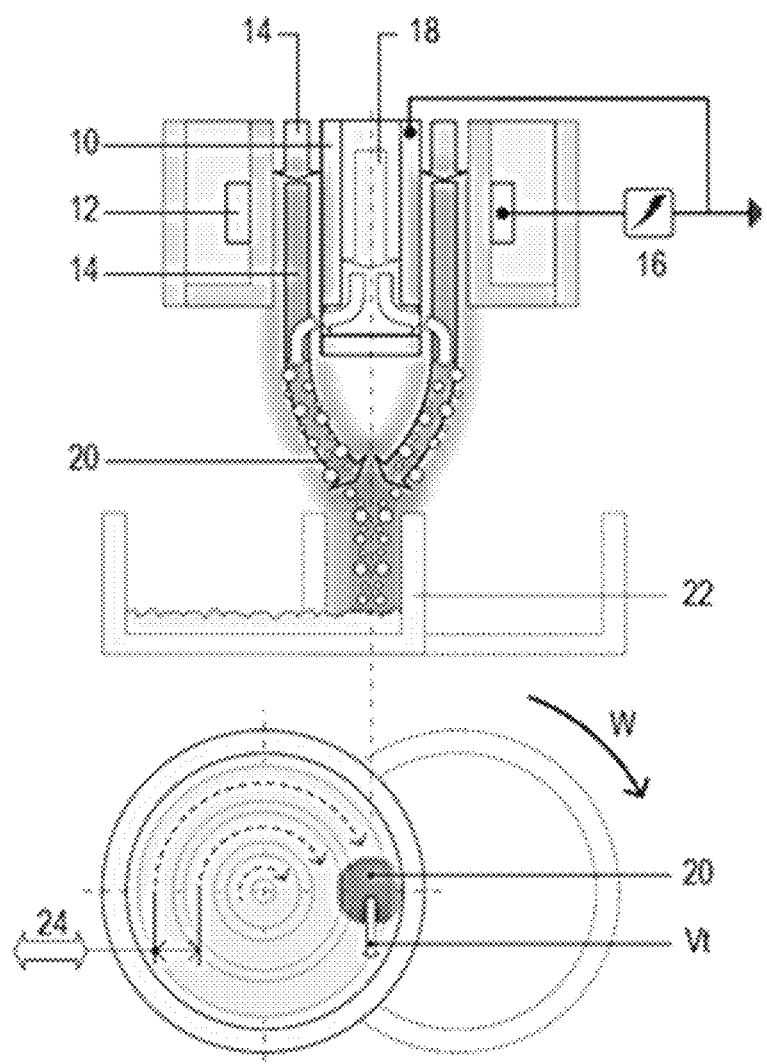
FIG. 1 is a schematic cross-section view of a device for carrying out a method of producing a pro-biofilm coating according to the preferred embodiment of the present invention.

Plasma is the state a gas achieves when an amount of energy that ionizes its molecules and atoms is supplied to it. That is, the transition of matter from gaseous state to plasma state occurs by means of a dissociation of molecular bonds, accompanied by an increase or decrease in the electrons of the atoms, which gives rise to the formation of positively or negatively charged ions. Thermal plasma is distinguished from cold plasma depending on whether or not there is thermal equilibrium between plasma particles.

A non-equilibrium or cold plasma is that in which the temperature of the electrons (105-5000° C.) is much higher than that of the heaviest particles (neutral particles and ions), which are at temperatures close to ambient temperature (25-100° C.). The temperature of a cold plasma is thereby generally kept below 100° C., which allows it to be used in surface treatments on a wide range of materials without causing deterioration thereof due to excessive heating.

Cold plasma can be generated at atmospheric pressure in an open environment, i.e., it does not require using vacuum systems or chambers in which specific conditions are established. These characteristics make cold atmospheric plasma technology highly versatile, relatively simple, and cost-effective. From the viewpoint of its industrial application, plasma has become an important tool for carrying out a number of surface treatments.

One of the main modifications to which the surface of a substrate treated with plasma can be subjected is "plasma polymerization". This modification consists of the deposition of thin coatings using monomers in liquid state as precursors through their exposure to the plasma stream.

In a specific embodiment of the present invention, the plasma polymerization method using non-equilibrium or cold atmospheric plasma equipment (APPJ) was used for applying pro-biofilm coatings on Petri dishes under study. The selection of the different precursors to be deposited and operating parameters of the plasma (input variables) determine the specific characteristics of the coating obtained. This versatility is of vital importance when the physico-chemical properties of the surface coatings are intended to be modified in a specific manner.

Another feature that makes this technology very attractive is that it works at room temperature and at atmospheric pressure, which largely facilitates its possible application to already existing production lines.

The APPJ equipment used (see FIG. 1) consists of two coaxial electrodes (10, 12), between which the gas (14) flows to generate plasma (in this specific case, nitrogen ($N_2$) with a stream of 80 slm was used). The inner electrode (10) is grounded, while the outer electrode (12) is excited with a specific frequency (high voltage current) by means of a generator (16) with a power of 300 W. The precursor material (18) (1.5 slm of $N_2$ which atomizes and transports the liquid precursor material) is introduced through the inner electrode (10) into the area of action of the plasma (20).

According to the preferred embodiment of the present invention, and still referring to FIG. 1, the method of producing a pro-biofilm coating comprises, first, the step of activating the surface of the Petri dish (22) (or other substrate to be coated) by means of a plasma jet (for example, $N_2$ plasma) without polymerizable precursor material. This activation and cleaning of the surface is preferably performed by means of 4 passes with plasma. One skilled in the art will understand that in other embodiments according to the invention, this prior step of surface activation may be omitted.

Next, the step of applying per se a stream (20) of cold atmospheric plasma (14) and precursor material (18) on the surface of the Petri dish (22) is performed.

Furthermore, the method also preferably comprises the step of performing, simultaneously with the application of the plasma stream, a relative movement between the substrate to be coated and the plasma stream so as to cover the entire surface of the substrate.

The plasma stream (20) projected onto the surface (which transforms, transports, and projects the precursor material onto the base of the Petri dish) has a diameter of about 10 mm. Therefore, for the homogeneous application of the coating (preferred embodiment) over the entire base of the Petri dish (22), this jet must move across the entire base (diameter of 30 mm). Given that the plasma (80 slm of $N_2$) and precursor (1.5 slm of $N_2$ which atomizes and transports the precursor material) streams are constant, for applying a homogeneous coating, this movement must be at a constant speed.

To that end, the Petri dish (22) rotates and moves (along one axis) simultaneously with the application of the plasma stream (20). Meanwhile, the plasma application equipment remains still. Evidently, according to alternative embodiments, the Petri dish may remain still while a plasma application nozzle moves. According to another additional alternative, both the Petri dish and the plasma application nozzle may move simultaneously with one another.

The linear (tangential) coating speed (Vt) is constant (10 mm/s). Every time one turn is coated (at a specific radius) the rotating speed (W) is modified (decreasing at the edge, increasing at the center) for the linear speed (Vt) to remain constant at all times. For every complete turn made by the Petri dish (22), it moves along the axis a specific forward movement distance (24). Keeping the linear speed (Vt) constant allows the applied coating to be homogeneous.

A "pass" is defined as every time the plasma jet completely coats the base of the Petri dish. Different coatings have been obtained by applying from 2 up to 96 passes, as described hereinbelow.

Following the method described above, various pro-biofilm coatings were made using as precursor material either (3-aminopropyl)triethoxysilane (APTES) or a mixture in various proportions of polyethylene glycol methyl ether methacrylate (PEGMA, MW: 500) and isopropanol (IPA). Likewise, Petri dishes made of either polystyrene (PS) with a diameter of 30 mm (pre-treated with plasma and uncoated) or glass with a diameter of 90 mm were used. Table 1 below details the properties of the various samples of coatings made according to the method of the present invention:

TABLE 1

| Sample | Passes | Substrate | Precursor |
| --- | --- | --- | --- |
| 0p | 0 | PS | — |
| 2p | 2 | PS | APTES (100%) |
| 4p | 4 | PS | APTES (100%) |
| 12p | 12 | PS | APTES (100%) |
| 24p | 24 | PS | APTES (100%) |
| 48p | 48 | PS | APTES (100%) |
| 72p | 72 | PS | APTES (100%) |
| 96p | 96 | PS | APTES (100%) |

TABLE 1-continued

| Sample | Passes | Substrate | Precursor |
| --- | --- | --- | --- |
| 0V | 0 | Glass | — |
| 48V | 48 | Glass | APTES (100%) |
| PG5 | 2 | PS | PEGMA (5%)/IPA (95%) |
| PG10 | 2 | PS | PEGMA (10%)/IPA (90%) |
| PG100 | 2 | PS | PEGMA (100%) |

To quantify the percentage of biofilm produced (with respect to that produced by a control of uncoated Petri dish) which generates the bacterium *Pseudomonas aeruginosa* on the studied samples, a technique with fluorescein diacetate (FDA) was used. According to the literature, said technique is used both to measure the microbial activity in the total biofilm (Adam and Duncan, 2001; Schnürer and Rosswall, 1982; Taylor et al., 2001), and to quantify the biofilm biomass (Honraet et al., 2005; Prieto et al., 2004). The biofilm was quantified after 24 hours of incubation at 37° C.

Figure 2:
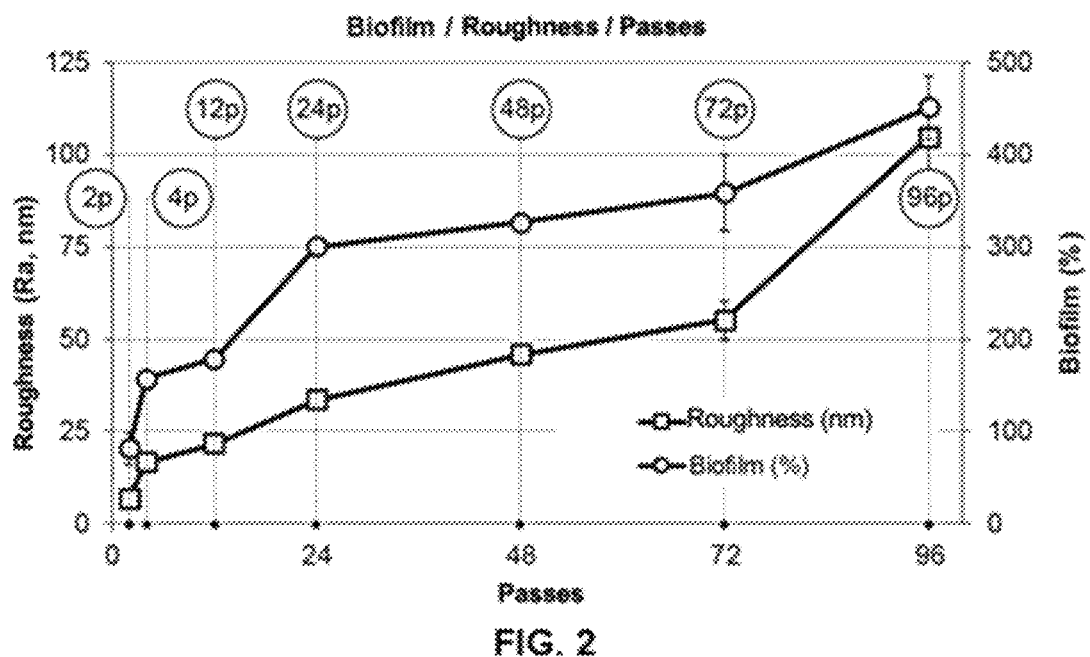
FIG. 2 is a graph showing the relationship between passes, coating roughness and % of biofilm produced with respect to the control, with polystyrene being used as substrate and (3-aminopropyl)triethoxysilane (APTES) as precursor material, according to a preferred embodiment of the present invention.

As can be seen in FIG. 2, in the case of APTES coatings applied on PS (polystyrene) there is a direct relationship between the number of passes, coating roughness and the % of biofilm produced with respect to the control (uncoated PS substrate). By increasing the number of passes, both roughness and % of biofilm increase. As the passes take place, the morphology of the coating transitions becomes from being virtually smooth (Ra=6.69 nm with 2 passes) to presenting a granular structure (Ra=105 nm with 96 passes) typical of silicon oxide-based coatings (APTES is a siloxane which produces silicon oxides when polymerized by plasma). This granular structure can be identified in AFM and SEM images (see FIGS. 3A and 3B) and is what justifies the increase in coating roughness (FIG. 2).

Figure 4:
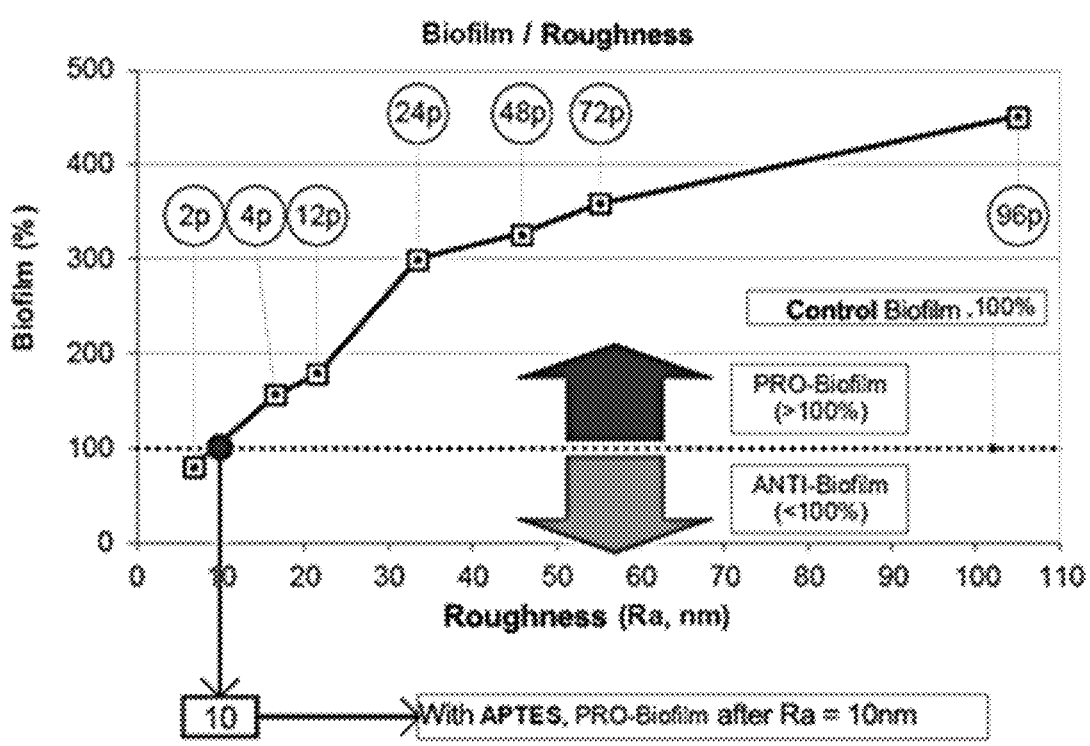
FIG. 4 is a graph showing the relationship between coating roughness and the % of biofilm obtained with respect to the control, with polystyrene being used as substrate and APTES as precursor material, according to a preferred embodiment of the invention.

FIG. 4 shows the relationship between the roughness of APTES-based coatings and the % of biofilm produced in each of them. The coatings generating less biofilm than that produced in the control sample (the one that has not been coated, 0p, equivalent to 100% biofilm) are defined as anti-biofilm (<100%), while the coatings generating more than 100% biofilm are defined as pro-biofilm (>100%).

Taking this into account, "pro-biofilm limit" is defined as the roughness on the basis of which a biofilm greater than 100% is obtained (with respect to that generated in the control 0p).

In FIG. 4, it can be identified that in the coatings applied on PS and obtained by means of APTES-based plasma polymerization, the pro-biofilm limit is a minimum roughness Ra of about 10 nm (Ra: average roughness).

Next, the preceding method was repeated using as a substrate a glass rather than a PS Petri dish. Glass dishes have a roughness very similar to PS dishes (uncoated PS; 0p Ra=4.87±1.13 nm and uncoated glass; 0V→Ra=4.67±0.98 nm).

A glass dish was coated with 48 passes.

Otherwise, the coating method was identical to that used with PS Petri dishes described above and APTES was used as liquid precursor material.

It was experimentally determined that the coating applied on the glass dish with 48 passes (48V) presented a roughness and % of biofilm with respect to the control (Ra=33.2±1.27 nm and 368±18%) very similar to the sample 24p with the coating applied on a PS plate with 24 passes (Ra=33.4±1.3 nm and 300±3.5%).

In this sense, it can be concluded that those APTES-based coatings having a very similar roughness generate a similar % of biofilm regardless the substrate on which they have been applied. The only difference in this case is that to obtain a coating on the glass with a roughness similar to that of PS, it was necessary to apply more passes (48 passes for glass and 24 passes for PS).

Based on the foregoing, it can be concluded that an APTES-based coating, with a specific roughness, generates a similar amount of biofilm, regardless the substrate (polystyrene, glass, or other) on which it is applied.

Next, the coating method described above was repeated using mixtures of PEGMA (MW500) and IPA at different concentrations instead of APTES.

In this case, the number of passes was set to 2 and the percentage by weight of PEGMA in a PEGMA and IPA dilution (5, 10, and 100% by weight) was varied.

Figure 5:
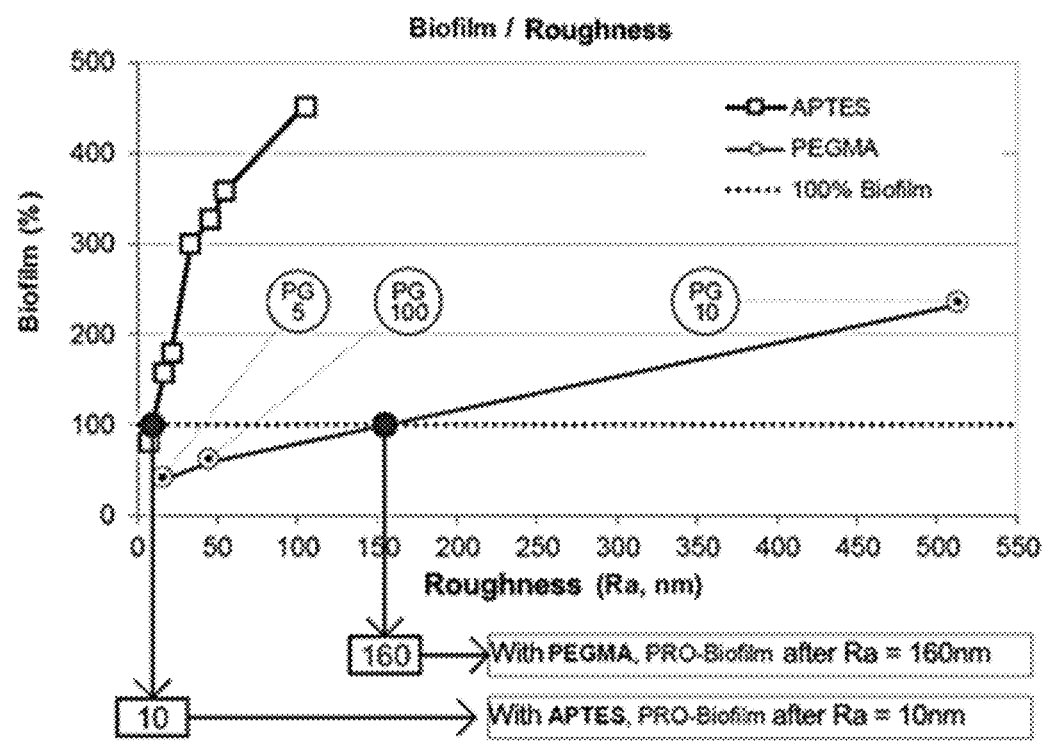
FIG. 5 is a graph showing the relationship between coating roughness and the % of biofilm obtained with respect to the control according to another preferred embodiment of the invention in which a mixture of polyethylene glycol methyl ether methacrylate (PEGMA) and isopropanol (IPA) is used as precursor material.

FIG. 5 shows the relationship between roughness and the % of biofilm of coatings applied on PS using APTES (preceding embodiment) and PEGMA+IPA (present embodiment) as liquid precursor materials. It can be observed in said figure that PEGMA-based coatings require greater roughness to obtain the amount of biofilm generated with APTES-based coatings. In this sense, although the pro-biofilm limit of APTES coatings is about 10 nm (roughness on the basis of which a biofilm greater than 100% with respect to the control is obtained), in the case of PEGMA-based coatings the pro-biofilm limit is 160 nm (FIG. 5).

Figure 3A:
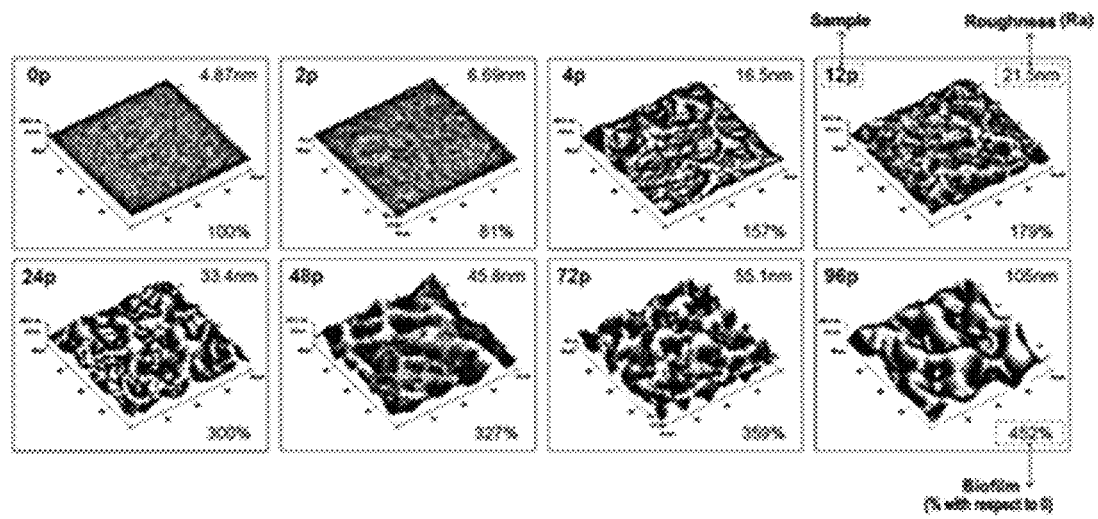
FIGS. 3A and 3B show atomic force microscopy (AFM) and scanning electron microscopy (SEM) images, respectively, of coatings obtained according to a preferred embodiment of the present invention, in which the percentage of biofilm obtained with respect to the control is also indicated.
Figure 3B:
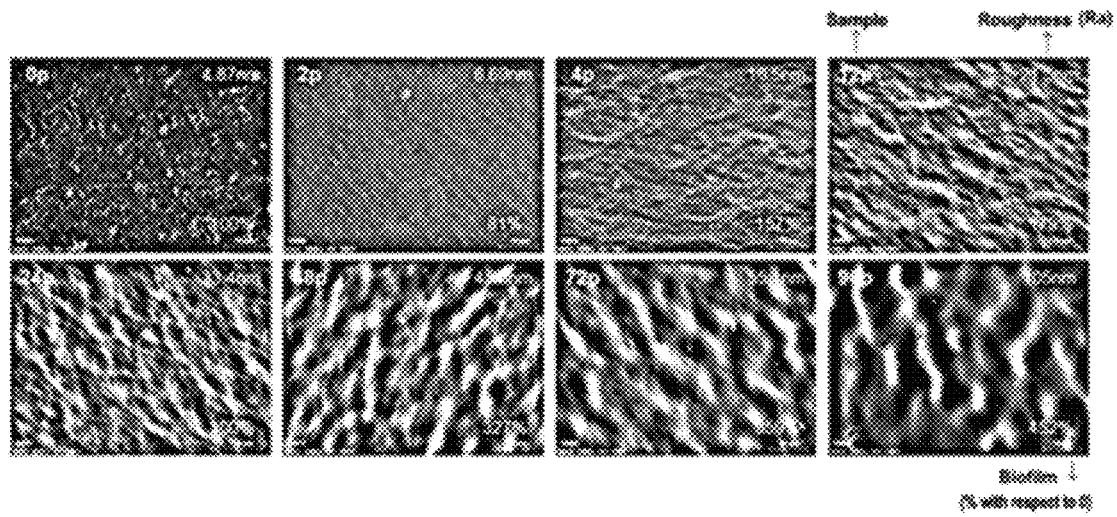
Figure 6:
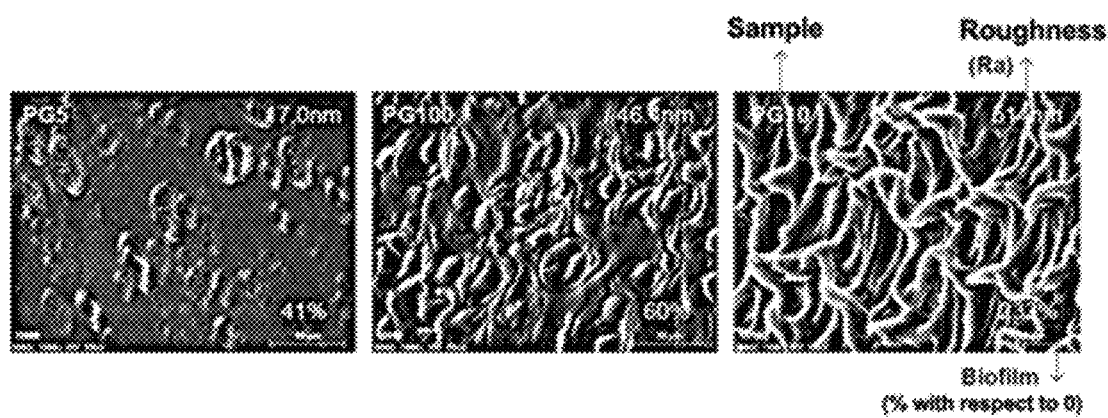
FIG. 6 shows SEM images of coatings obtained according to another preferred embodiment of the present invention, in which the percentage of biofilm obtained with respect to the control is also indicated.

From these results, it can be concluded that it is not possible to define a common pro-biofilm limit for coatings based on different precursor materials. One of the possible reasons justifying the non-existence of a common pro-biofilm limit may be related to the fact that each precursor material produces a coating with a specific surface pattern. If it is taken into account that the surface morphology (roughness) has a significant relationship with the amount of biofilm generated, it is reasonable to think that different surface patterns will make microorganisms produce different amounts of biofilm. FIG. 6 shows SEM images of the 3 coated samples with PEGMA+IPA. In all cases, it can be seen that the morphology of the coating surface is considerably different from that of the APTES-coated samples (FIGS. 3A and 3B). The case of sample PG10, in which the morphology of its coating follows a fiber-like pattern, while that of any APTES-based sample has a particle-based pattern, is particularly interesting.

In any case, regardless the precursor used (APTES or PEGMA), it is found that as roughness increases, the biofilm increases. Likewise, in any case there is a specific roughness on the basis of which the coating is pro-biofilm.

Next, a chemical and wettability characterization of the pro-biofilm coatings according to the embodiments of the present invention was performed.

The chemical characterization was performed by means of X-ray photoelectron spectroscopy (XPS) analysis and the wettability characterization was performed by means of analysis of the water contact angle (WCA) measurement.

Figure 7:
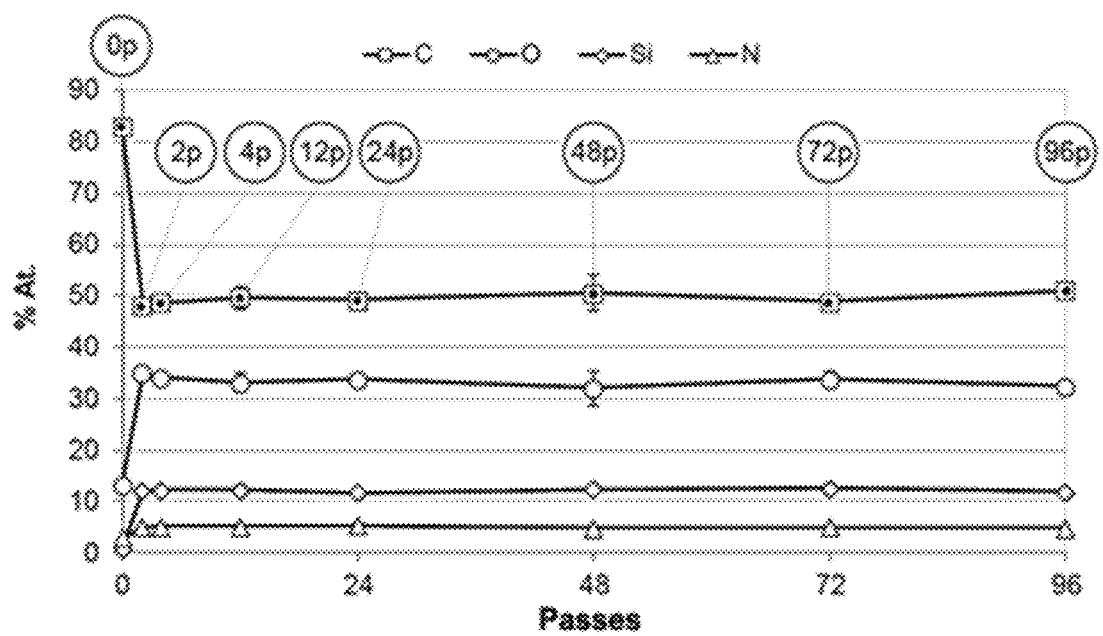
FIG. 7 is a graph showing the relationship of the atomic percentage of carbon (C), oxygen (O), silicon (Si), and nitrogen (N) with respect to the number of passes according to an embodiment of the present invention.

By means of XPS analysis, it is possible to identify and quantify the chemical composition of the first 3 to 5 nanometers of the coating (after which the biofilm grows). FIG. 7 shows the atomic percentage of the elements present (C, O, Si, and N) in each of the studied APTES-based coatings (uncoated, 0p, and coated with 2, 4, 12, 24, 48, 72, and 96 passes). These elements (C, O, Si, and N) come from APTES plasma polymerization (in the case of coated samples), the PS surface (in the case of the uncoated control Petri dish), and the surrounding air during the coating process.

In the case of the uncoated sample (0p), it is possible to identify the typical percentages present in PS (polystyrene) which are considerably different from those of the coated samples (for example, high percentage of carbon). This uncoated sample (0p) is the only one in which silicon is not detected as this element comes from APTES.

It may be concluded based on said FIG. 7 that the chemical composition of the surface of ALL the coatings is very similar and independent of their roughness (or number of passes applied).

Figure 8:
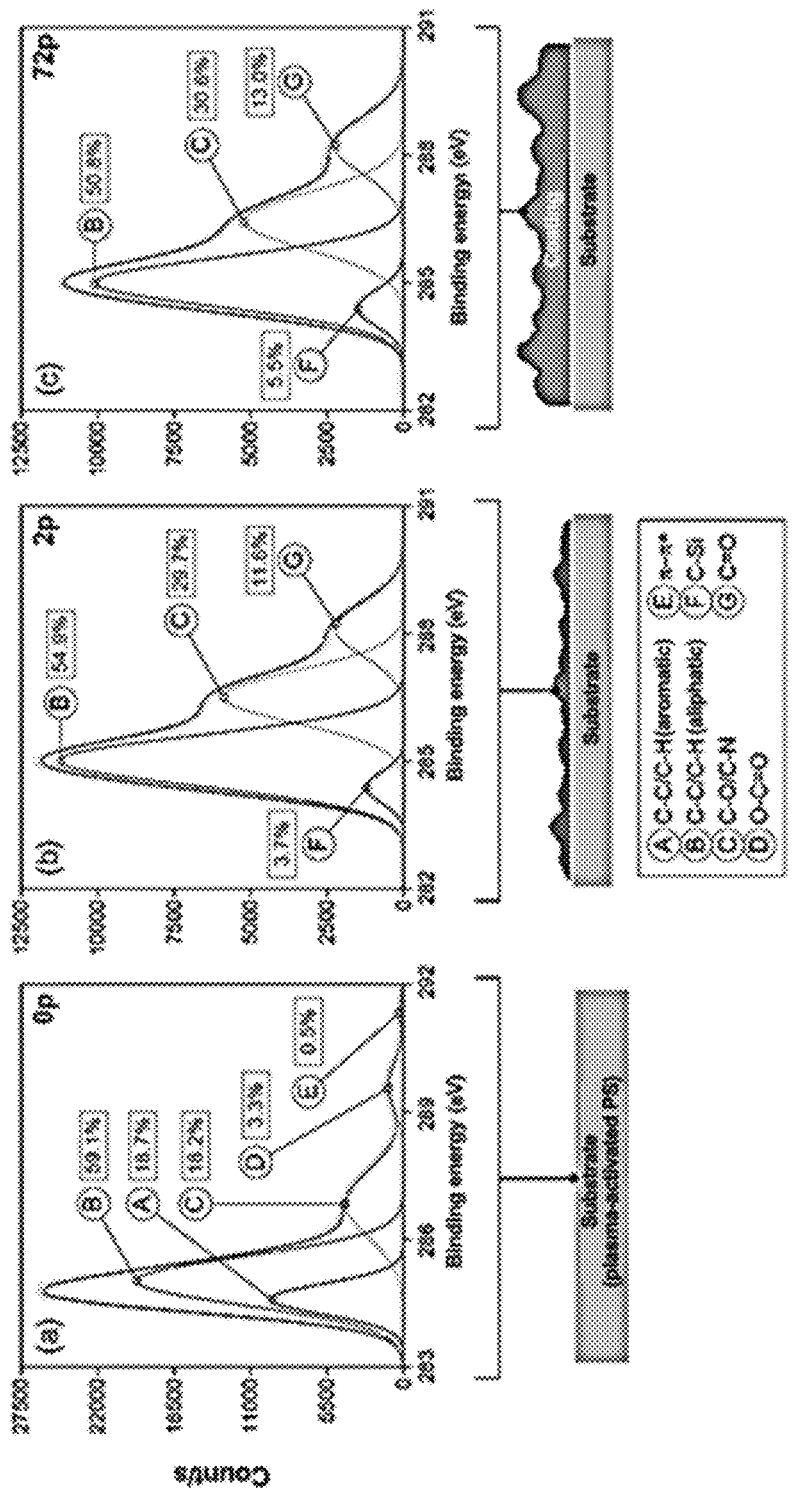
FIG. 8 shows graphs depicting the deconvolution of the high resolution spectrum of carbon for different numbers of passes according to a preferred embodiment of the invention.

Moreover, by means of XPS analysis it is also possible to identify and quantify the bonds of each of the previously identified elements (C, O, Si, and N). FIG. 8 shows the deconvolution (or decomposition) of the "total" high resolution spectrum of the carbon (C1s) of samples 0p, 2p, and 72p.

The deconvolution of carbon (C1s) is a common practice in surface chemical characterization. This deconvolution allows the partial spectra making up the total spectrum to be identified. Each partial spectrum corresponds to a specific bond to which the carbon is bound. The area of each partial spectrum (associated with a specific bond) allows its presence on the surface to be quantified with respect to the total bonds.

FIG. 8 shows the percentage relating to each bond (inscribed in a rectangle). In the case of deconvolution of the sample 0p (uncoated PS Petri dish) the typical bonds to which the carbon is bound in a plasma-treated PS sample (uncoated, only plasma) are identified. The PS Petri dishes which were used in this study had been pre-treated with plasma by the supplier (Nunc™ Petri dishes/cell cultures, by Thermo Scientific™) for surface activation. In this sample (0p), it is possible to identify the bonds: [A] aromatic C—C and C—H, [B] aliphatic C—C and C—H, [C] C—O/C—N groups, [D] O—C=O, and [E] π-π*. Groups [A], [B], and [E] come from the PS molecule, while groups [C] and [D] are formed during plasma treatment (performed by the PS Petri dish supplier). When the PS Petri dishes are coated by means of APTES-based plasma polymerization (samples 2p and 72p, representative of all the APTES-coated samples), bonds [A], [D], and [E] disappear and bonds [F] C—Si and [G] C=O coming from the polymerized APTES appear. Bonds [B] and [C] are common to plasma-activated PS and to polymerized APTES.

Based on the analysis of the bonds and percentages shown in FIG. 8, it can be concluded that the chemical structure of the surface of the coated samples (2p and 72p) is very different from the uncoated sample (0p), by both the percentages of total elements (C, O, Si, and N in FIG. 7) and the bonds to which the carbon is associated (FIG. 8).

Furthermore, the chemical structure of the surface of the coated samples (samples 2p and 72p, representative of all the APTES-coated samples) is very similar regardless the large difference in roughness existing between both of them (Ra of 2p=6.7 nm and Ra of 72p=55.1 nm).

Finally, based on the foregoing, the increase in biofilm production (greater roughness) is not determined by the chemical nature of the coatings, as there are no substantial differences between them which justify the increase in biofilm production.

Next, characterization was performed by means of WCA analysis, where WCA is the angle formed by the surface of a liquid upon contact with a solid. The contact angle value primarily depends on the relationship between the adhesive forces between the liquid and the solid and the cohesive forces of the liquid. The higher the adhesive forces, the lower the WCA.

Figure 9:
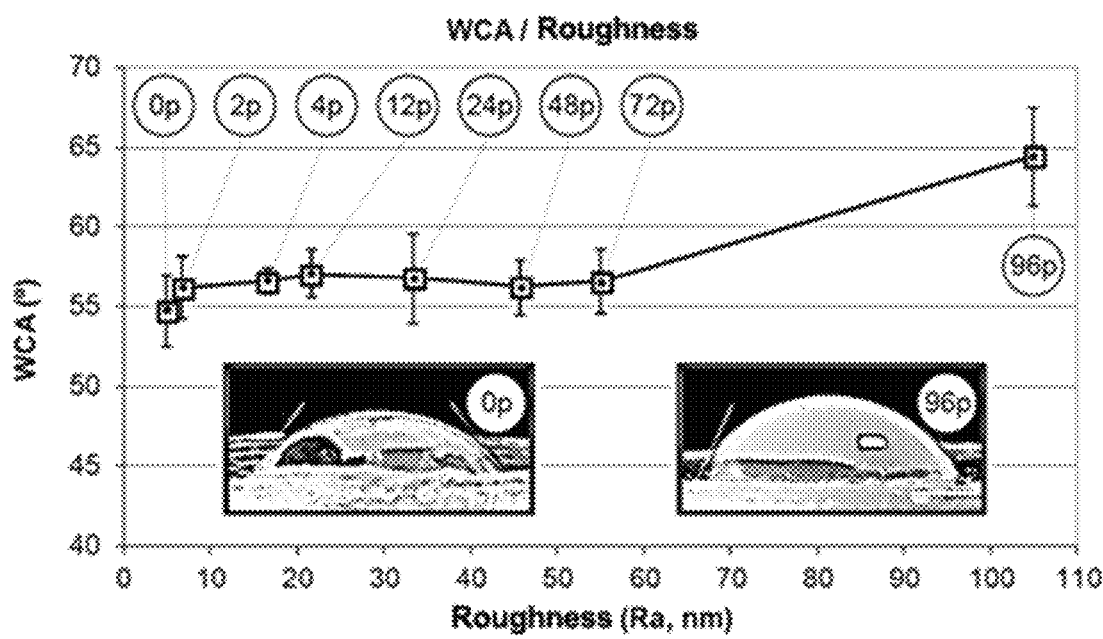
FIG. 9 is a graph depicting the relationship between coating roughness and water contact angle of coatings according to a preferred embodiment of the invention.

FIG. 9 shows the relationship between roughness and WCA of the studied APTES-based coatings (uncoated, 0p, and coatings with 2, 4, 12, 24, 48, 72, and 96 passes). It can be observed in said figure that all the coated samples (except for 96p) have a WCA very similar to that of the uncoated sample (0p). This means that the coated surface does not have an adhesive capacity greater than that of the uncoated sample (0p). Therefore, the amount of biofilm produced in said coatings does not depend on the increase in adhesion (decrease in WCA) conferred by the same.

Therefore, in summary and with respect to coatings on PS using APTES, all the coatings have the same "chemistry" and "wettability", and all the coatings have a different "morphology" and "% of biofilm".

Therefore, the increase in the % of biofilm does not depend on the "chemistry" or "wettability" (adhesion) of the coating, but rather depends on of the modification of the "morphology" thereof (roughness).

Next, bacterial growth was studied (see FIG. 10) for 24 hours (0, 3, 6, and 24 hours) in uncoated samples (0p) and in samples with coatings with 2, 4, 12, 24, and 48 passes. The bacterial growth of each sample was determined using a Bio-Rad 680XR Microplate Reader spectrophotometer and measuring the absorbance at a wavelength of 620 nm.

Figure 10:
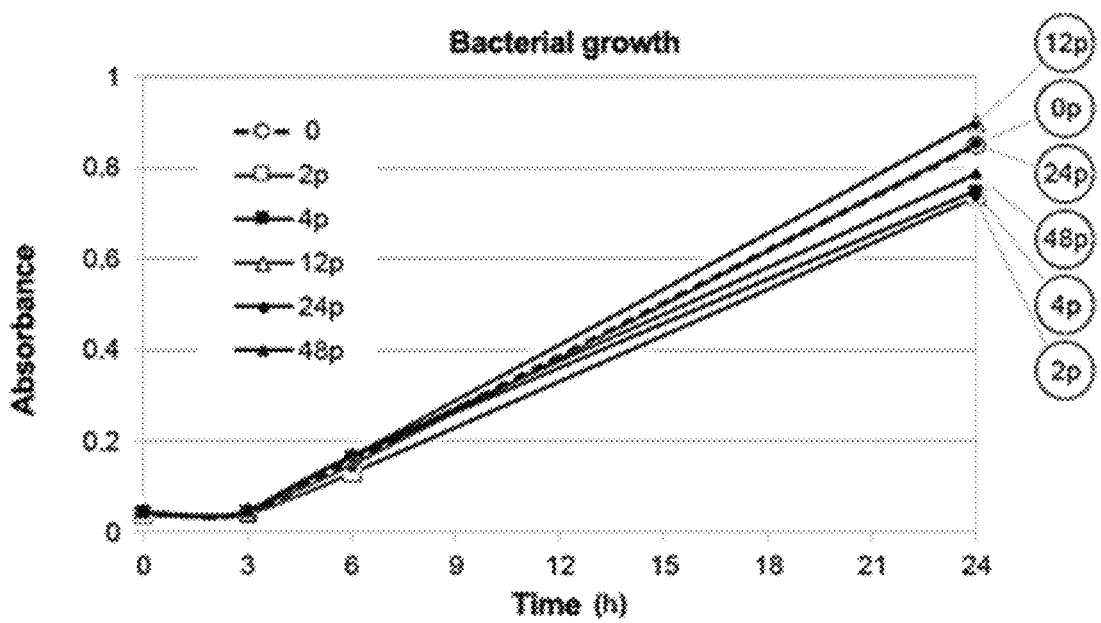
FIG. 10 is a graph showing the bacterial growth over time with different coatings obtained according to a preferred embodiment of the present invention.

It can be observed in FIG. 10 that only in coating 12p did more bacteria grow than in the uncoated sample (0p). That is, in most of the coated samples fewer bacteria grew than in the control. Therefore, the production of more biofilm by said samples (with respect to the uncoated sample, 0p) is not due to an increase in the number of adhered microorganisms.

The Biofilm "Over-Production" Mechanism

Next, the biofilm creation mechanisms according to the present invention will be described in detail.

Figure 11:
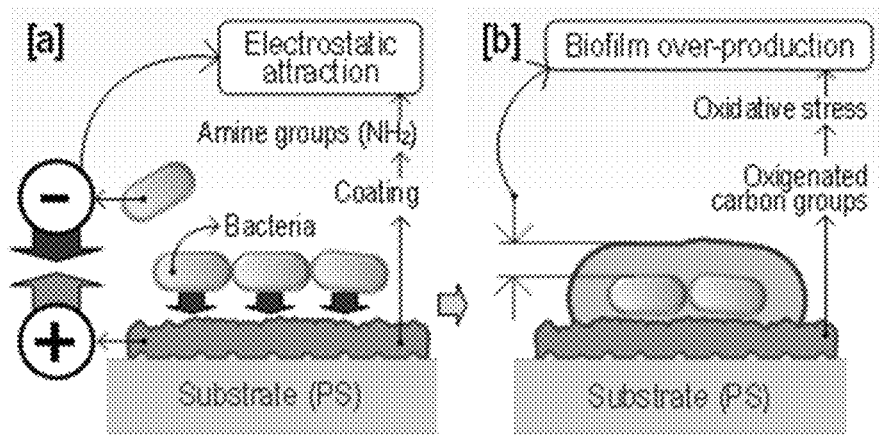
FIG. 11 is a diagram of the biofilm over-production mechanism (PRO-Biofilm) produced in the coating of the present invention.

In the first colonization phases of a surface by bacteria, the amine groups ($NH_2$) present in the coating (coming from the plasma polymerization of APTES) promote adhesion therein, and subsequently, the carbon-oxygen groups (C—O, O—C=O, and C=O, also coming from the APTES and the surrounding atmosphere) produce oxidative stress promoting the creation of a larger amount of biofilm by the bacteria (in response to the mentioned stress). FIG. 11 shows a diagram of the biofilm over-production mechanism (PRO-Biofilm) produced in the coating of the present invention. FIG. 11a shows a diagram of the initial adhesion of the bacteria to the coating. This adhesion is due to the electrostatic attraction generated by amines (positively charged) on bacteria (usually negatively charged). FIG. 11b shows a diagram of the biofilm over-production after adhesion. This over-production is due to the oxidative stress produced by carbon-oxygen (C—O, O—C=O, and C=O) groups on bacteria. The bacteria feel threatened and respond by generating a larger amount of biofilm (protection).

Figure 12:
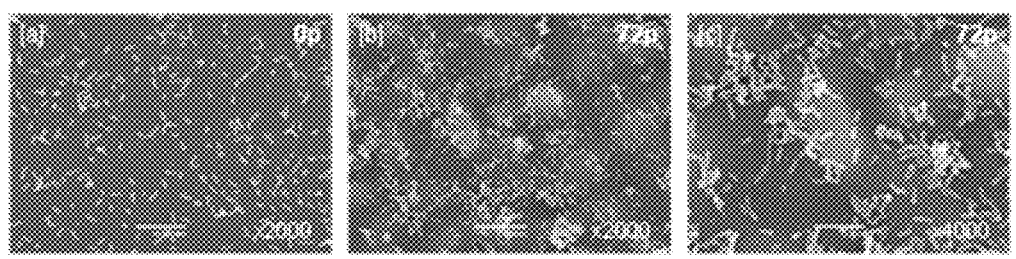
FIG. 12 represents SEM (scanning electron microscopy) images of: [a] Uncoated substrate (×2000), [b] Coating 72p (×2000), and [c] Coating 72p (×4000).

Once the bacteria has been adhered to the surface of the coating, the increase in roughness (which is produced by increasing the passes) promotes the creation of biofilm (the greater the roughness, the more biofilm). The increase in coating roughness is promoted by the silicon oxide ($SiO_x$, coming from the plasma polymerization of APTES) groups because every time a pass is applied, these groups build up in the coating in the form of spherical particles and clusters thereof having a larger size as the number of passes increases. The increase in roughness facilitates the creation of bacterial colonies, the adhesion thereof, and finally the generation of a larger amount of biofilm. FIG. 12 shows SEM (scanning electron microscopy) images of: [a] Uncoated substrate (×2000 increase), [b] Coating 72p (×2000 increase) and [c] Coating 72p (×4000 increase). In these images it is possible to identify the bacteria (*Pseudomonas aeruginosa*) adhered to the surface of each sample. Far less bacteria can be seen in the image of FIG. 12a than in FIG. 12b. Both in FIG. 12b and in FIG. 12c it can be observed how the bacteria have formed clusters in the valleys of the rough surface of the coating 72p. In these images it is not possible to identify the biofilm, as it is destroyed during the preparation of the sample prior to being introduced in the microscope (fixing and dehydrating the sample).

Figure 13:
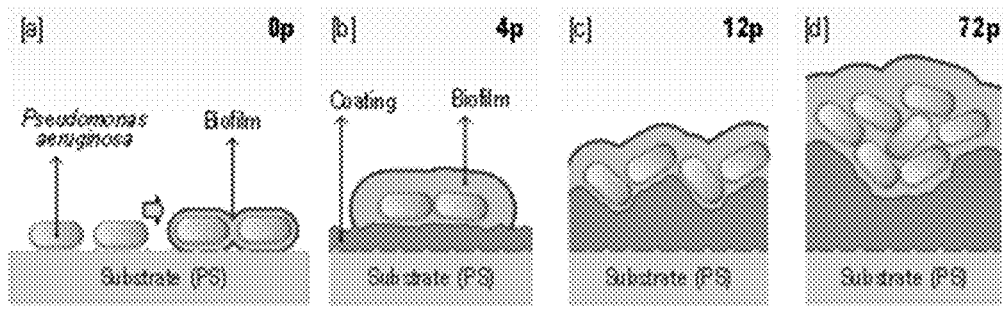
FIG. 13 shows a diagram of the biofilm over-production as roughness increases with passes: [a] Uncoated 0p, [b] 4 passes, 4p, [c] 12 passes, 12p, and [d] 72 passes, 72p.

FIG. 13 shows a diagram of biofilm production as coating roughness increases (PRO-Biofilm) with passes. FIG. 13a depicts the phase of adhesion and creation of a biofilm from a bacterium (*Pseudomonas aeruginosa*) on the uncoated substrate. In the following images in FIGS. 13b, c and d, the formation of colonies and the increase in the amount of biofilm as a coating roughness increases (from 4 passes, 4p, up to 72, 72p) is depicted. FIG. 13a would correspond to the image of FIG. 12a and FIG. 13d would correspond to the image of FIG. 12b and FIG. 12c.

Figure 14:
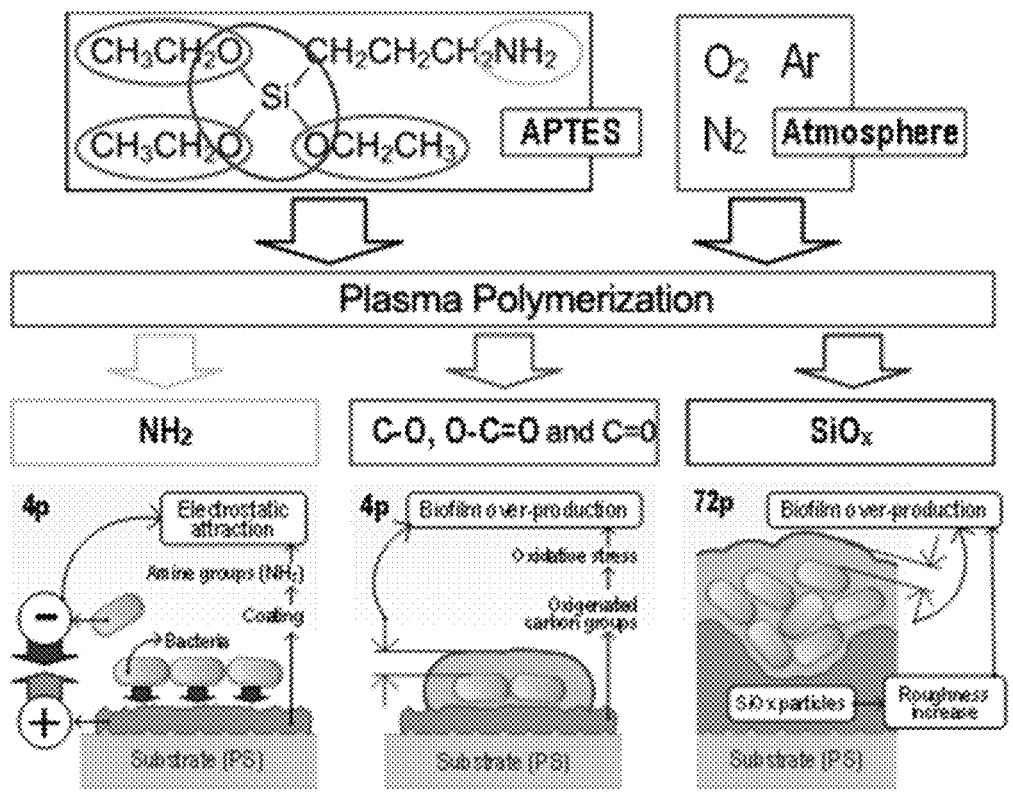
FIG. 14 shows a diagram of how the APTES molecule functions.

Finally, FIG. 14 shows a diagram depicting the "function" of each "part" of the APTES molecule after it has been broken down in the plasma polymerization process at atmospheric pressure. The amino groups ($NH_2$) promote adhesion of the bacteria, the carbon-oxygen (C—O, O—C=O, and C=O) groups "stress" the bacteria, making them generate, as protection, a larger amount of biofilm, and finally, the silicon oxide ($SiO_x$) groups build up in different agglomerates (the size of which depends on the number of passes) promoting the formation of larger bacterial colonies with the subsequent higher biofilm production.

Figure 15:
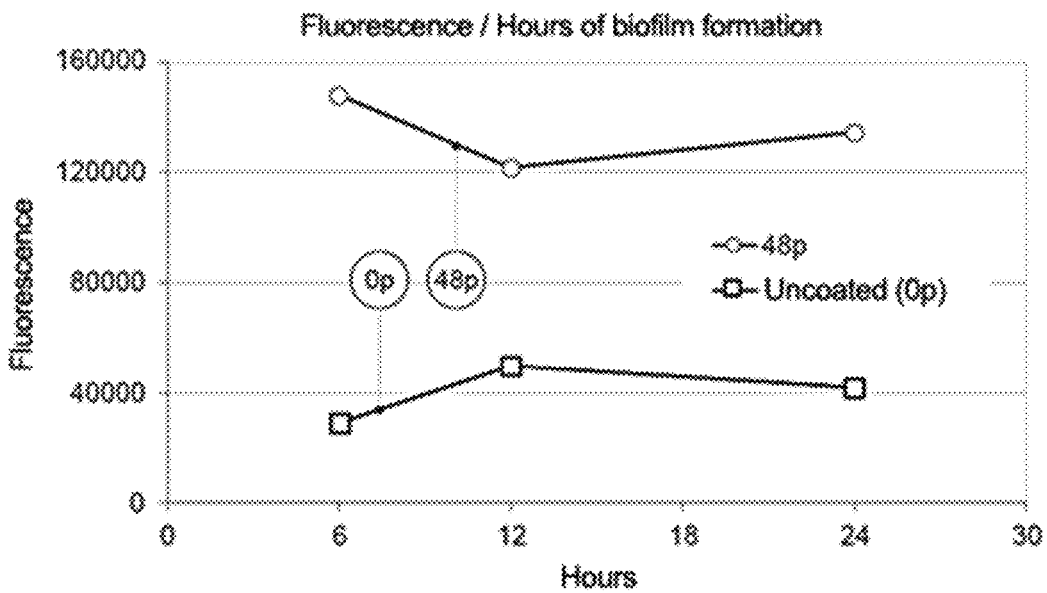
FIG. 15 is a graph showing the amount of biofilm produced over time with a coating according to a preferred embodiment of the present invention compared with the control.

Finally, the speed of biofilm generation was determined by means of coatings according to the present invention. FIG. 15 shows the amount of biofilm (measured by means of FDA) generated in samples 0p and 48p for 24 hours (measurements taken at 6, 12, and 24 hours). It can be observed in said figure that the maximum amount of biofilm produced in the sample 48p is achieved at 6 hours after inoculation, being at that time (6 h) significantly higher than the biofilm produced in the uncoated sample (0p). This speed is of vital importance when it is necessary to urgently determine which treatment is optimal for a patient in a specific situation (most effective antibiotic and dose thereof).

Preferred embodiments of the present invention have been described in detail above. However, one skilled in the art might make modifications and variations therein without departing from the scope of protection defined by the following claims. For example, specific precursor materials and substrates have been described in the specific embodiments of the invention; however, one skilled in the art may apply the teachings disclosed herein to determine, by means of routine experiments, other combinations of precursor materials, substrates, and numbers of passes with plasma to provide pro-biofilm coatings having sufficient roughness so as to promote the creation of more than 100% biofilm, compared with the biofilm produced on the same substrate devoid of pro-biofilm coating, according to the present invention.

The invention claimed is:

1. A pro-biofilm coating applied on a substrate by means of cold atmospheric plasma polymerization of a precursor comprising carbon-oxygen groups, namely C—O, O—C=O, and C=O, which produce oxidative stress promoting creation of biofilm by bacteria, the coating having a roughness such that it promotes the creation of more than 100% biofilm on the substrate, where the 100% of biofilm is the one as produced on the same substrate being devoid of said pro-biofilm coating.

2. The pro-biofilm coating according to claim 1, characterized in that the precursor material constituting the coating is selected from the group consisting of (3-aminopropyl) triethoxysilane (APTES) and a mixture of polyethylene glycol methyl ether methacrylate (PEGMA, MW: 500) and isopropanol (IPA).

3. The pro-biofilm coating according to claim 2, characterized in that the precursor material constituting the coating is APTES and the coating has a minimum average roughness (Ra) of more than 10 nm.

4. The pro-biofilm coating according to claim 2, characterized in that the precursor material constituting the coating is a mixture of PEGMA and IPA and the coating has a minimum average roughness (Ra) of more than 160 nm.

5. The pro-biofilm coating according to claim 1, characterized in that the substrate is selected from the group consisting of polystyrene and glass.

6. A method of producing a pro-biofilm coating as defined in claim 1, comprising applying a cold atmospheric plasma stream and coating precursor material on a substrate surface to be coated until obtaining a roughness such that it promotes the creation of more than 100% biofilm on the substrate, where the 100% of biofilm is the one as produced on the same substrate being devoid of said pro-biofilm coating.

7. The method according to claim 6, characterized in that it further comprises the step of performing, simultaneously with the application of the plasma stream, a relative movement between the substrate to be coated and the plasma stream so as to cover the entire surface of the substrate.

8. The method according to claim 6, further comprising the prior step of activating the surface of the substrate by means of plasma without precursor material.

9. The method according to claim 6, characterized in that the applied plasma is N2 plasma.

10. The method according to claim 9, characterized in that the plasma stream consists of 80 slm of N2.

11. The method according to claim 6, characterized in that the applied precursor material is selected from the group consisting of APTES and a mixture of PEGMA and IPA.

12. The method according to claim 11, characterized in that the precursor material is applied in liquid phase, transported by a stream of 1.5 slm of N2.

13. The method according to claim 6, characterized in that the precursor material is applied in liquid phase, transported by a stream of 1.5 slm of N2.

14. The method according to claim 6, characterized in that the substrate is selected from the group consisting of polystyrene and glass.

15. The method according to claim 6, characterized in that the application of the coating is performed homogeneously on the entire surface of the substrate.

* * * * *